United States Patent [19]
Yang

[11] Patent Number: 5,230,795
[45] Date of Patent: Jul. 27, 1993

[54] QUICK RELEASE OIL FILTER

[76] Inventor: Wen-Chen Yang, No. 68, Hsishe Rd., Chinshui Chen, Taichung Hsien, Taiwan

[21] Appl. No.: 805,940

[22] Filed: Dec. 12, 1991

[51] Int. Cl.$^5$ .................................................. B01D 27/08
[52] U.S. Cl. ........................................ 210/236; 210/238; 210/440; 210/443; 210/444; 210/450; 210/DIG. 17
[58] Field of Search ............ 210/168, 232, 238, 416.5, 210/440, 443, 444, 450, DIG. 17, 236

[56] References Cited

U.S. PATENT DOCUMENTS

| | | | |
|---|---|---|---|
| 3,282,429 | 11/1966 | Wood | 210/232 |
| 3,540,594 | 11/1970 | Sanderson | 210/232 |
| 3,950,251 | 4/1976 | Hiller | 210/232 |
| 4,151,823 | 5/1979 | Grosse | 210/167 |
| 4,588,503 | 5/1986 | Sugiura | 210/232 |
| 4,659,466 | 4/1987 | Farr | 210/238 |
| 4,764,275 | 8/1988 | Robichaud | 210/232 |
| 4,767,530 | 8/1988 | Gilliam | 210/232 |
| 4,851,117 | 7/1989 | Foust | 210/236 |
| 5,076,918 | 12/1991 | Foust | 210/238 |
| 5,084,162 | 1/1992 | Conti | 210/232 |

*Primary Examiner*—Thomas M. Lithgow
*Attorney, Agent, or Firm*—Sixbey, Friedman, Leedom & Ferguson

[57] ABSTRACT

An oil filter for an engine including a shell having a cap enclosed at the bottom, the cap having a housing extended upward for receiving a spring and a nut and having a number of holes located around the housing, a filter disposed in the shell, a tube disposed in the shell and having a lower end engaged with the engine, a quick release having a lower end engaged with the tube, the oil filter can be easily locked by the quick release.

2 Claims, 4 Drawing Sheets

QUICK RELEASE OIL FILTER

BACKGROUND OF THE INVENTION

1. Field of the Invention

The present invention relates to an oil filter, and more particularly to a quick release oil filter which can be easily mounted in place and can be easily disengaged.

2. Description of the Prior Art

Typical oil filters are required to be threaded onto the engine body in the limited space of the engine room, and then an additional tool, soph as ratchet wrench, is further required to screw the oil filters so as to lock the oil filters in place. Generally, the space for reception of the oil filters and for operation of the tool is limited such that the tool can not be easily operated. Therefore, it is very difficult to lock and to unlock the oil filters.

The present invention has arisen to mitigate and/or obviate the afore-described disadvantages of the conventional oil filters.

SUMMARY OF THE INTENTION

The primary objective of the present invention is to provide a quick release oil filter which can be easily mounted in place and can be easily disengaged.

In accordance with one aspect of the invention, there is provided an oil filter for an engine including a shell having an orifice formed in the upper portion and having a cap enclosed at the bottom, the cap having a housing extended upward therefrom, the cap including a plurality of holes formed therein and located around the housing, the housing including an opening formed in an upper portion thereof, a filter element disposed in the shell, a nut engaged in the inner surface of the housing and arranged such that the nut is slidable upwards and downwards relative to the housing and rotated in concert with the housing, a spring disposed between the housing and the nut for biasing the housing and the cap upward relative to the nut, a tube disposed in the shell and including a lower end threaded engagement with the nut and including an upper end extended upward through the orifice of the shell, an inner thread formed in the upper end of the tube, the engine including a stub formed therein for engagement with the nut so that the shell can be coupled to the engine, a quick release including a casing located above the shell, a bolt having an upper end slidably engaged in the casing and having a lower end threadedly engaged with the inner thread of the tube, the upper end of the bolt including an aperture formed therein, a lever having a cam formed thereon and engaged in the aperture of the bolt, whereby, the bolt can be caused to move upward and downward relative to the casing when the lever is rotated, and the cap and the shell being pressed toward the engine by the casing of the quick release so that the oil filter can be locked when the casing is caused to move downward relative to the bolt and when the lever is rotated in one direction.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
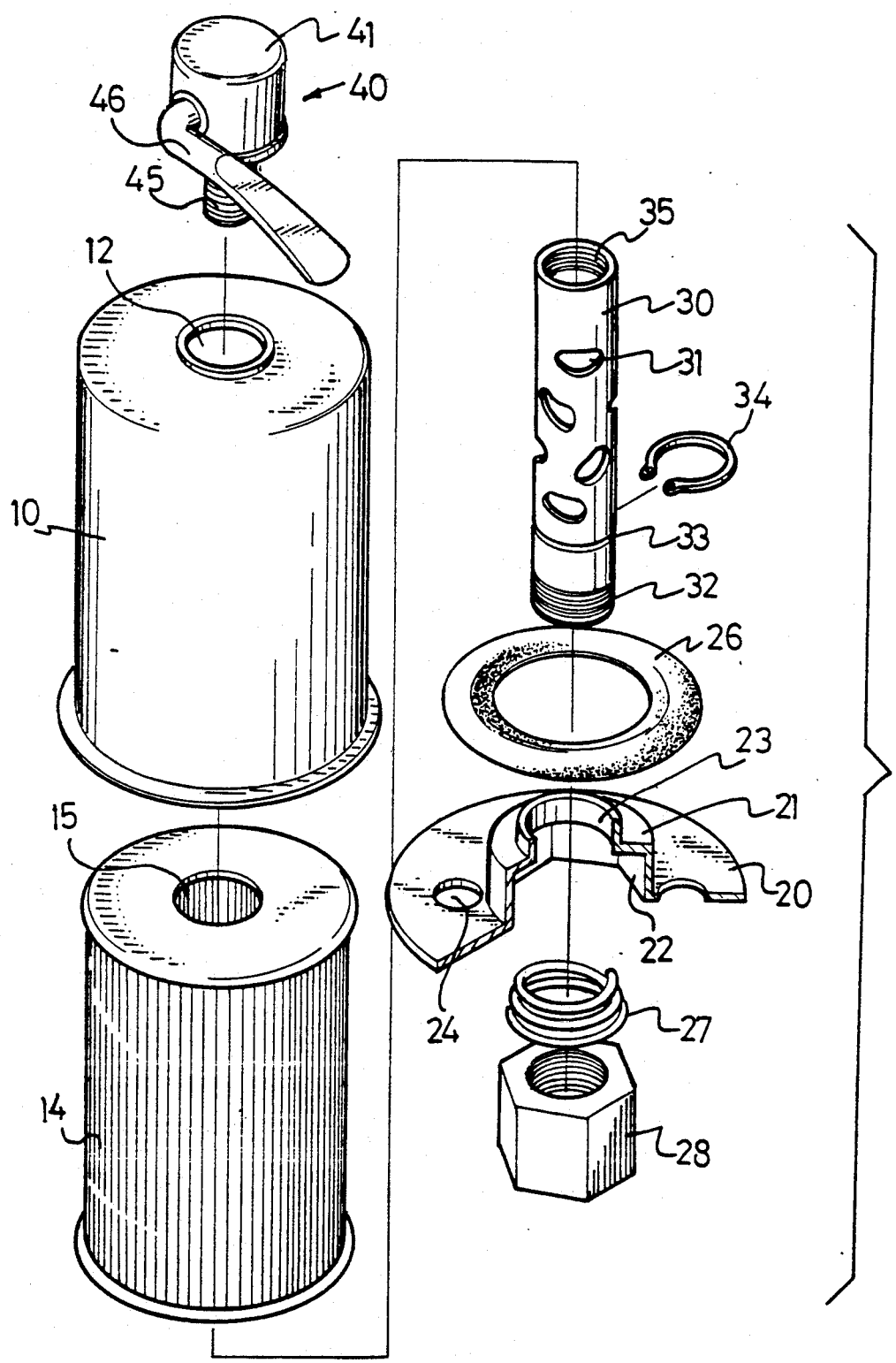
FIG. 1 is an exploded view of an oil filter in accordance with the present invention.
Figure 2:
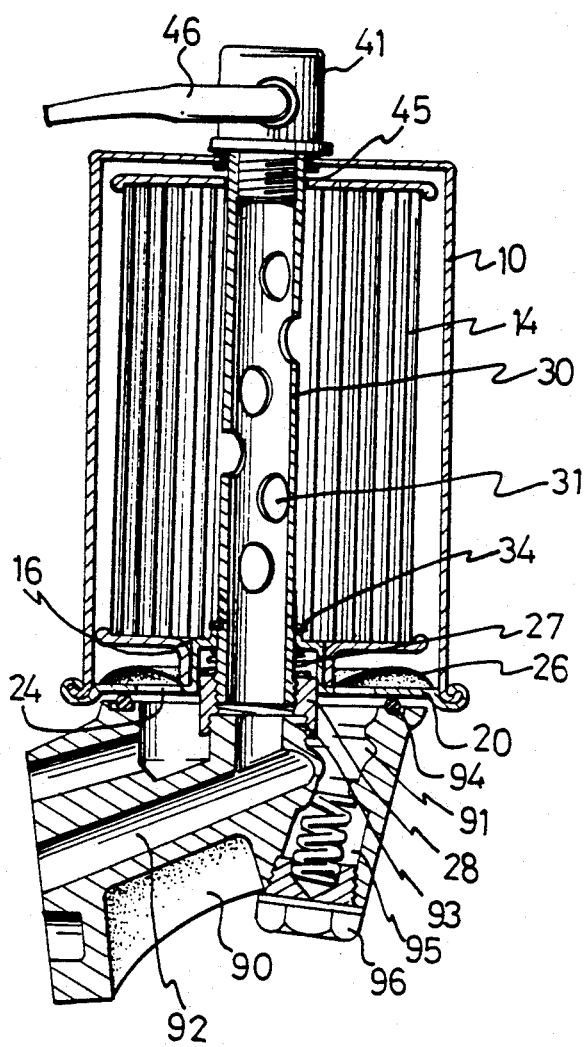
FIGS. 2 and 3 are cross sectional views illustrating the operations of the oil filter.

Referring to the drawings and initially to FIGS. 1 and 2, an oil filter in accordance with the present invention comprises generally a shell 10 enclosed at the bottom by a cap 20. The shell 10 has a cylindrical shape including an orifice 12 formed in the top portion thereof The cap 20 has a circular shape including a cylindrical housing 21 extended upward from the center thereof The housing 21 includes an inner engaging surface 22 which ha a hexagonal cross section, and includes an opening 23 formed in the top portion thereof. A plurality of apertures 24 which are preferably equally spaced are formed in the cap 20 and around the housing 21.

A ring shaped membrane 26 is convex upward and is disposed on the cap 20 for covering the apertures 24 of the cap 20, best shown in FIG. 2. A spring 27 and a ut 28 are received in the housing 21 of the cap 20, in which the hexagonal outer engaging surface of the nut 28 is slidably engaged with the inner engaging surface 22 of the housing 21 so that the nut 28 can be guided to move upward and downward relative to the housing 21 and rotates in concert with the cap 20. A filter element 14 which is cylindrically shaped is disposed in the shell 10 and is retained in place by the cap 20. The filter element 14 includes a hole 15, 16 formed in the upper portion and the lower portion thereof respectively, in which the housing 21 is engaged in the hole 16 formed in the bottom portion of the filter element 14.

A tube 30 includes a plurality of holes 31 formed therein and has an outer thread 32 formed on the lower end thereof for threaded engagement with the nut 28. An annular groove 33 is formed in the lower portion of the tube 30 for engagement with a clamping ring 34. The tube 30 also includes an inner thread 35 formed in the upper end thereof. The upper end of the tube 30 extends through the orifice 12 of the shell 10.

As shown in FIG. 2, the engine 90 includes an annular passage 91 aligned with the holes 24 of the cap 20 so that oil from the annular passage 91 may flow into the shell 10 via the holes 24 of the cap 20, and a conduit 92 formed in the middle portion thereof. It is to be noted that the convex shape of the membrane 26 is provided such that the membrane 26 will be pushed away from sealing engagement when oil flows into the shell 10 via the holes 24 of the cap, however, the membrane 26 will be pushed toward the cap 20 to seal the holes 24 when the oil tends to flow out of the shell 10 via the holes 24 so that oil is prevented from flowing into the annular passage 91. A stub 93 is formed in the outer portion of the conduit 92 and has an outer thread formed thereon for engagement with the nut 28 so that the oil filter can be coupled to the engine 90. The conduit 92 is communicated with the hollow interior of the tube 30. A sealing ring 94 is provided between the cap 20 and the engine 90 for making the water tight seal. The engine 90 includes an outlet 95 closed by a nut 96 so that oil can be released. As shown in FIG. 2, the cap 20 and the shell 10 are biased upward and are caused to move slightly away from the engine 90 by the spring 27. The clamping ring 34 limits the movement of the housing 21 relative to the tube 30.

Figure 4:
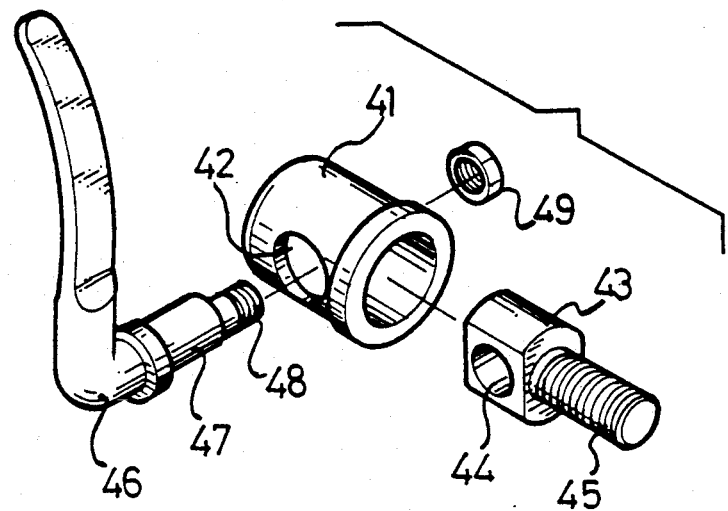
FIG. 4 is an exploded view of a quick release.
Figure 5:
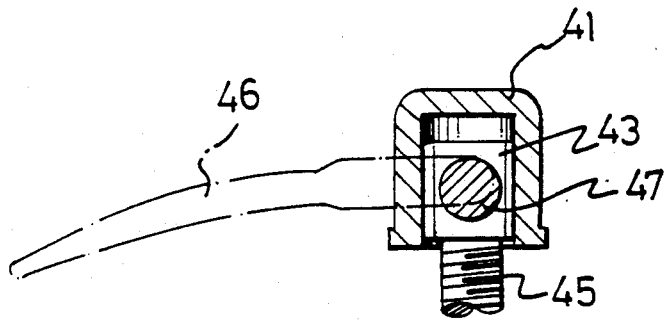
FIGS. 5 and 6 are cross sectional views of the quick release illustrating the operations of the quick release.
Figure 6:
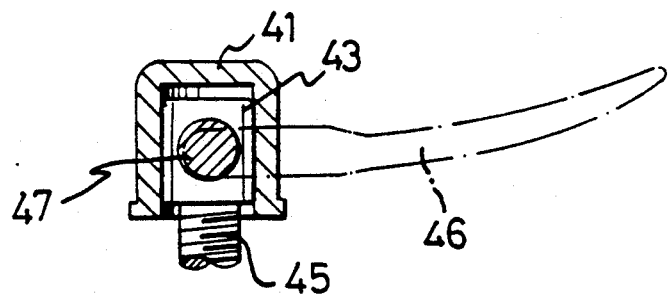

Referring next to FIGS. 4 to 6, a typical quick release 40 includes a casing 41 which has two holes 42 oppositely formed therein. A block 43 is slidably engaged in the casing 41 and has an aperture 44 formed therein and has a bolt 45 extended outward therefrom. The bolt 45 also extends outward of the casing 41 and is threadedly engaged with the inner thread 35 of the tube 30. A lever 46 includes a cam 47 formed on the middle portion of one leg thereof, which leg includes an outer thread 48 formed on the free end thereof for engagement with a nut 49 so that the lever 46 can be coupled to the casing 41. The cam 47 is engaged in the aperture 44 of the block 43. As shown in FIGS. 5 and 6, when the lever 46 is rotated, the block 43 can be caused to move upward and downward relative to the casing 41.

Figure 3:
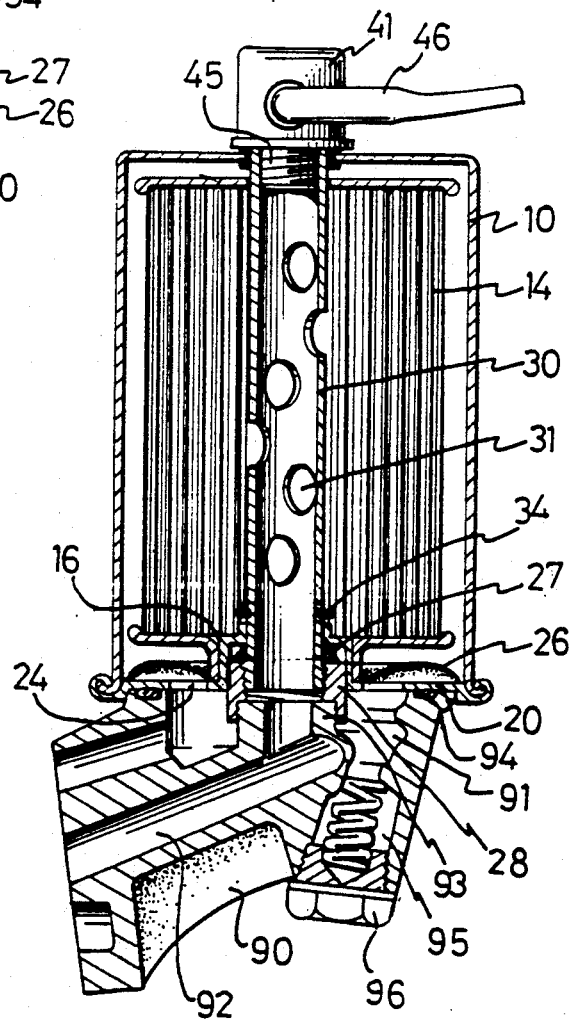

Referring next to FIG. 3, when the lever 46 of the quick release 40 is rotated, the casing 41 is caused to move downward relative to the bolt 45 so that the shell 10 can be pushed downward and so that the cap 20 can be caused to urge against the engine 90, whereby, the oil filter can be locked. When it is desired to release the oil filter, it is only required to rotate the lever in a reverse direction, the oil filter can thus be released.

Accordingly, the oil filter in accordance with the present invention can be easily mounted in place and can be easily disengaged, and no additional tool is required.

Figure 7:
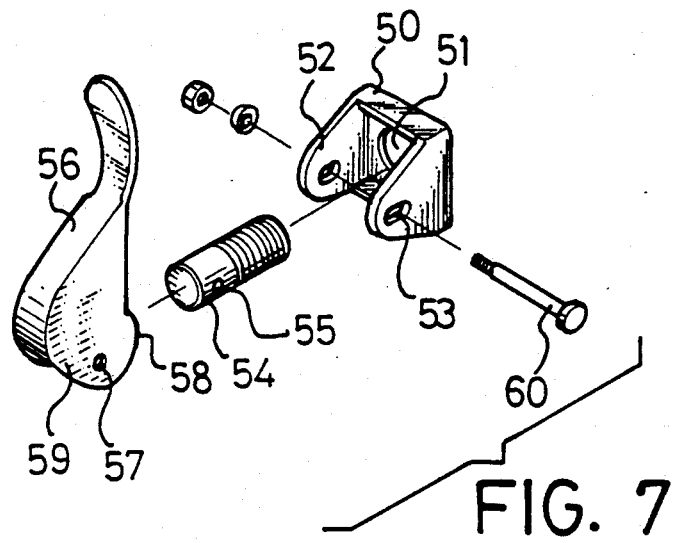
FIG. 7 is an exploded view illustrating another type of quick release.
Figure 8:
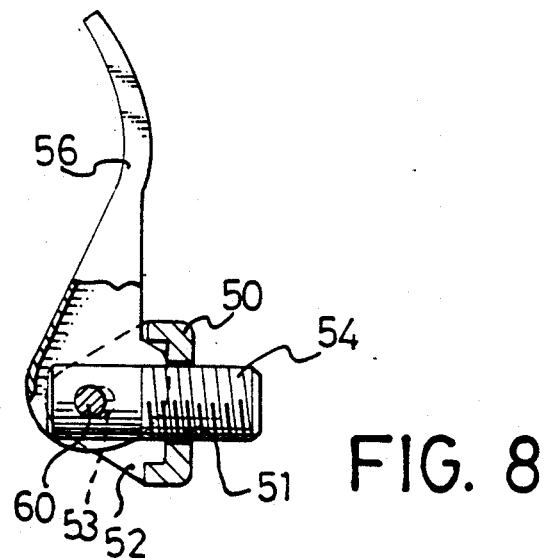
FIGS. 8 and 9 are cross sectional views illustrating the operations of the quick release a shown in FIG. 7.
Figure 9:
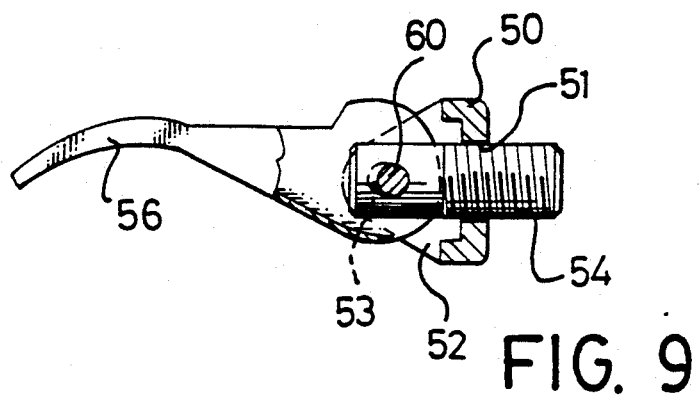

Referring next to FIGS. 7 to 9, another type of quick release includes a base 50 which has an access 51 formed therein and has two lugs 52 oppositely extended therefrom. Each of the lugs 52 has an oblong hole 53 formed therein. A bolt 54 extends through the access 51 of the base 50 and has an aperture 55 formed therein. A lever 56 includes two fins 59 formed on one end thereof, each of the fins 59 has a hole 57 formed therein and has a cam surface 58 formed on the perimeter thereof for engagement with the base 50. A shaft 60 extends through the oblong holes 53 of the base 50 and the aperture 55 of the bolt 54 and the holes 57 of the fins 59.

As shown in FIGS. 8 and 9, the bolt 54 can be caused to move up and down relative to the base 50 when the lever 56 is rotated. Accordingly, when the bolt 54 is threaded to the inner thread 35 of the tube 30 and when the base 50 is engaged on the upper portion of the shell 10, the shell 10 can also be pushed downward relative to the tube 30 by the base 50 so that the oil filter can be easily locked in place.

Accordingly, the oil filter can be easily mounted in place and can be easily disengaged, and no additional tool is required.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An oil filter for an engine comprising a shell including an upper portion having an orifice formed therein and a bottom portion, defining an open bottom, a cap enclosing said open bottom of said shell and including a housing extended upward therefrom, said cap including a plurality of holes formed therein and located around said housing, said housing including an opening formed in an upper portion thereof and including a first engaging surface formed in an inwardly facing surface thereof, a filter element disposed in said shell and in a flow path between said plurality of holes around said housing and said opening in the upper portion of said housing, a nut engaged in said housing, said nut including threads which are adapted to engage said engine and said nut including a second engaging surface formed on an outer surface thereof for engagement with said first engaging surface of said housing, said first and said second engaging surfaces being arranged such that said nut is slidable upwards and downwards relative to said housing and rotated in concert with the upper portion of said housing, a biasing means disposed between said housing and said nut for biasing said housing and said cap upward relative to said nut, a tube with at least one opening in a wall of said tube, said tube being disposed in said shell and including a lower end extended downward through said opening of said housing and passing through said biasing means and in threaded engagement with said nut and including an upper end extended upward through said orifice of said shell, an inner thread formed in said upper end of said tube, a quick release including a casing located above said shell, a bolt having an upper end slidably engaged in said casing and having a lower end threadedly engaged with said inner thread of said upper end of said tube, said upper end of said bolt including an aperture formed therein, a lever means being rotatably mounted to said casing and having a cam formed thereon and engaged in said aperture of said bolt, and for causing the bolt to move upward and downward relative to said casing when said lever means is rotated, whereby, said cap and said shell can be pressed toward said engine by said casing of said quick release when said casing is caused to move downward relative to said bolt and when said lever means is rotated in one direction so that said oil filter can be locked.

2. An oil filter for an engine comprising a shell including an upper portion having an orifice formed therein and a bottom portion defining an open bottom, a cap enclosing said open bottom of said shell and including a housing extended upward therefrom, said cap including a plurality of holes formed therein and located around said housing, said housing including an opening formed in an upper portion thereof and including a first engaging surface formed in an inwardly facing surface thereof, a filter element disposed in said shell and in a flow path between said plurality of holes around said housing and said opening in the upper portion of said housing, a nut engaged in said housing said nut including threads which are adapted to engage said engine and said nut including a second engaging surface formed on an outer surface thereof for engagement with said first engaging surface of said housing, said first and said second engaging surfaces being arranged such that said nut is slidable upwards and downwards relative to said housing and rotated in concert with said housing, a biasing means disposed between the upper portion of said housing and said nut for biasing said housing and said cap upward relative to said nut, a tube with at least one opening in a wall of said tube and said tube being disposed in said shell and including a lower end extended downward through said opening of said housing and passing through said biasing means and in threaded engagement with said nut and including an upper end extended upward through said orifice of said shell, an inner thread formed in said upper end of said tube, a quick release including a base located above said shell and having an access formed therein and including a pair of lugs extended upward therefrom, each of said lugs including an oblong hole formed therein, a bolt having a lower end threadedly engaged with said inner thread of the upper end of and having an upper end extended upward through said access to said base, a lever means rotatably mounted to said base and including a first end engaged on said upper end of said bolt and having a cam surface formed thereon for engagement with said base, and a shaft extended through said oblong holes of said lugs and said first end of said lever means and said upper end of said bolt, said lever means functioning to move the bolt upward and downward relative to said base when said lever means is rotated whereby said cap and said shell can be pressed toward said engine by said base of said quick release when said base is caused to move downward relative to said bolt by said cam surface of said lever means and when said lever means is rotated in one direction so that said oil filter can be locked.

* * * * *